US009391978B2

(12) United States Patent
Burch et al.

(10) Patent No.: US 9,391,978 B2
(45) Date of Patent: Jul. 12, 2016

(54) MULTIPLE ACCESS AUTHENTICATION

(75) Inventors: Lloyd Leon Burch, Payson, UT (US); Douglas Garry Earl, Orem, UT (US)

(73) Assignee: Novell, Inc., Provo, UT (US)

( * ) Notice: Subject to any disclaimer, the term of this patent is extended or adjusted under 35 U.S.C. 154(b) by 516 days.

(21) Appl. No.: 12/786,540

(22) Filed: May 25, 2010

(65) Prior Publication Data

US 2011/0296504 A1 Dec. 1, 2011

(51) Int. Cl.
*H04L 29/00* (2006.01)
*H04L 29/06* (2006.01)

(52) U.S. Cl.
CPC .................................. *H04L 63/0815* (2013.01)

(58) Field of Classification Search
USPC ........................................ 726/5; 713/156, 182
See application file for complete search history.

(56) References Cited

U.S. PATENT DOCUMENTS

| 2003/0177364 | A1* | 9/2003 | Walsh et al. | 713/182 |
| 2009/0210930 | A1 | 8/2009 | Lexcellent et al. | |
| 2011/0296504 | A1* | 12/2011 | Burch et al. | 726/6 |

FOREIGN PATENT DOCUMENTS

WO   WO-2005050422 A1   6/2005

OTHER PUBLICATIONS

"Introduction to Oracle Identity Federation", *Oracle® Identity Federation Administrator's Guide 10g (10.1.4.0.1)*, http://download.oracle.com/docs/cd/E10773_01/doc/oim.1014/b25355/intro.htm, (Copyright 2006, 2007) pp. 1-20.

Bhat, V., et al., "Achieving SSO With Sun Java System Access Manager and SAML", *Oracle Sun Developer Network (SDN)*, http://developers.sun.com/identity/reference/techart/sso.html, (Apr. 24, 2007) pp. 1-11.

Kudo, Tatsuo, "Access Manager / OpenSSO Integration with Shibboleth IdP", *tkudo's weblog, Identity Management (IdM) and Modern Evergreen Music, home.mcom.com | Main | OpenSSO V1 Build 4*, http://blogs.sun.com/tkudo/entry/opensso_integration_with_shibboleth_idp, (Apr. 1, 2008) pp. 1-4.

* cited by examiner

*Primary Examiner* — Brandon Hoffman
*Assistant Examiner* — Michael D Anderson
(74) *Attorney, Agent, or Firm* — Schwegman Lundberg & Woesnner, P.A.

(57) ABSTRACT

Apparatus, systems, and methods may operate to receive, at a generating identity provider (IDP), original user credentials sufficient to authenticate a user directly from a user machine, or indirectly from an initial identity provider. Additional activities may include generating, by the generating IDP, generated user credentials having the lifetime of a login session associated with the user, the lifetime initiated approximately when the original user credentials or a token associated with the user are/is validated at the generating IDP. Still further activities may include receiving a request associated with the user during the login session to access an application protected by an agent, and transmitting at least part of the generated user credentials from the generating IDP to the application to authenticate the user to the generating IDP while the login session is not terminated or expired. Additional apparatus, systems, and methods are disclosed.

20 Claims, 4 Drawing Sheets

MULTIPLE ACCESS AUTHENTICATION

BACKGROUND

In a user access management system, an Identity Provider (IDP) can be used to provide end-user authentication, forwarding credentials to back-end web servers to provide a single sign-on experience. In this way, users provide their access credentials, such as a username and password, only once. However, passing the actual credentials over a wired or wireless connection (even when accomplished using a secure sockets layer) is generally considered poor practice, because the user's password may be directly exposed to nefarious monitoring devices.

In some cases, such as when an access management IDP operates as a Service Provider (SP), receiving end-user authentication from another IDP in the form of a token, a password is not generally provided to the SP. This means that there is no password to send to back-end servers that might request this credential for access to their applications. Thus, the end-user password is sometimes not available in situations when a federated identity is used for authentication.

SUMMARY

In various embodiments, apparatus, systems, and methods that support secure, multiple access authentication are provided. For example, in some embodiments, multiple access authentication is implemented by receiving, at a generating identity provider (IDP), original user credentials sufficient to authenticate a user directly from a user machine, or indirectly from an initial identity provider. Additional activities may include generating, by the generating IDP, generated user credentials having a limited lifetime, perhaps governed by the login session associated with the user, and initiated approximately when the original user credentials or a token associated with the user are/is validated at the generating IDP. Further activities may include receiving a request associated with the user during the login session to access an application protected by an agent, and transmitting at least part of the generated user credentials from the generating IDP to the application to authenticate the user to the generating IDP while the login session is not terminated or expired. Additional embodiments are described, and along with the foregoing examples, will be set forth in detail below.

DETAILED DESCRIPTION

Figure 1:
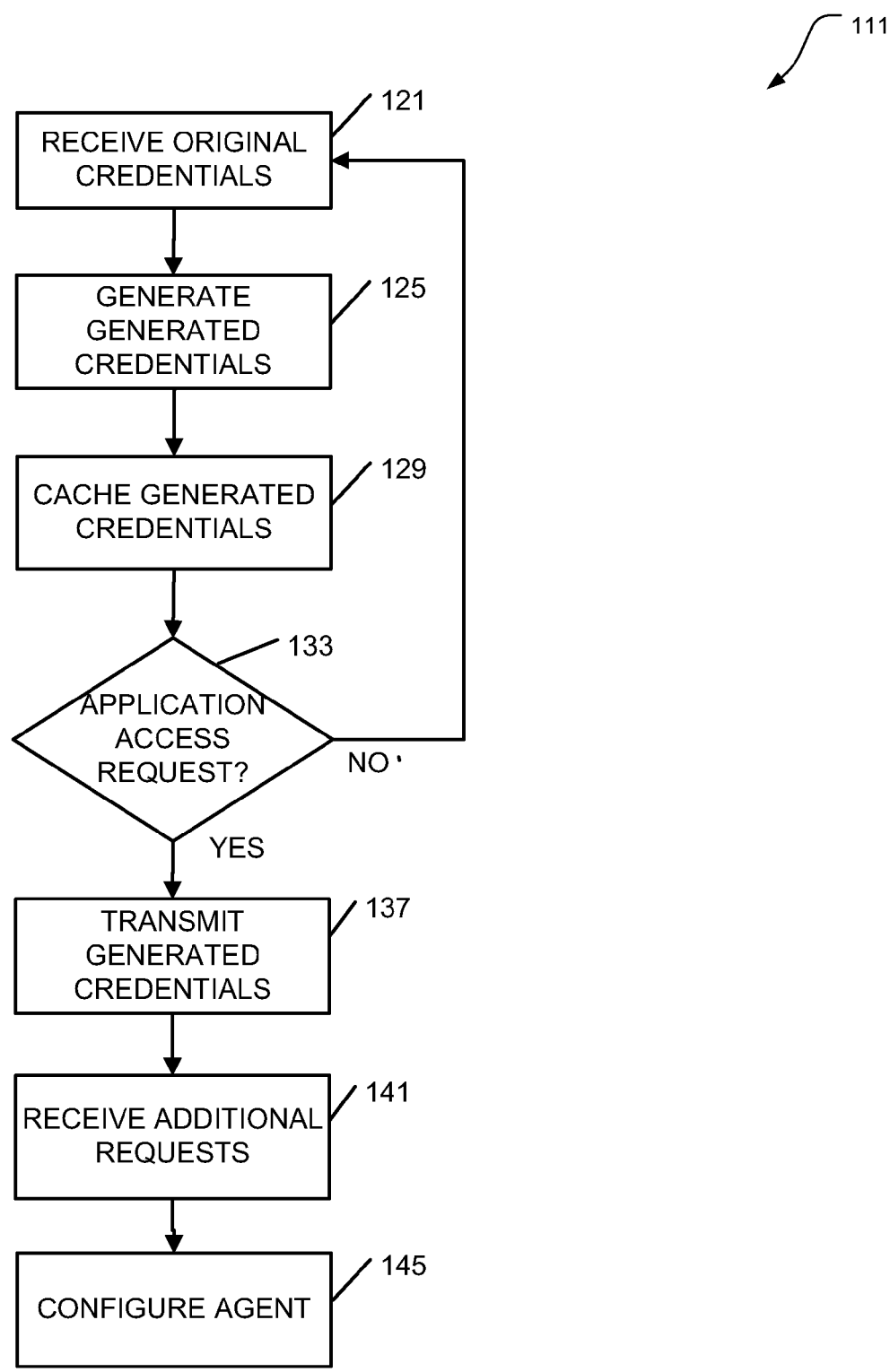
FIG. 1 is a flow diagram illustrating methods of implementing multiple access authentication according to various embodiments of the invention.

Authentication is the practice of verifying that users are who they say they are before granting them access to resources, such as applications. In various embodiments, multiple access authentication can be implemented using an identity token LDAP (Lightweight Directory Access Protocol) service. In this case, when the IDP authenticates a user, directly or indirectly, a one-time use LDAP name and password is generated on behalf of the user. The IDP then implements a simple LDAP server that can authenticate users and provide attributes. Back-end web servers can be reconfigured to use the IDP as the point of LDAP authentication. The one-time name/password is then used to authenticate the user, instead of the user's real LDAP credentials. This approach can provide better security than more conventional mechanisms.

For the purposes of this document, "credentials" (also known as claims by those of ordinary skill in the art) comprise anything that can be used to validate the identity of a user. A group of attributes (e.g., email address) in a signed token, for example, can thus be used as a credential, and therefore as a mechanism for user authentication. Other examples of credentials include passphrases, smart cards, PIN numbers, biometrics, and certificates.

Thus, in several embodiments, once authentication at the IDP (e.g., acting as an SP) occurs, a one-time use LDAP name and password are generated and stored. The one-time name/password can be made available as attributes that are provided to protected back-end web servers. A back-end web server that desires to authenticate a user can then obtain the one-time name/password and connection to the IDP using the LDAP, with authentication using the one-time name/password. Using the LDAP, the back-end web server can also obtain user attributes that may be requested.

As described, authentication occurs at the generating IDP. In some cases, an end user provides credentials, such as his name/password, to the generating IDP directly. In other cases, the user is authenticated indirectly, using a token (such as a security assertion markup language (SAML) token) provided by an external IDP, which in turn collects the user credentials directly. After the user is authenticated in either of these scenarios, the generating IDP generates a unique username and password, which can be stored in a local memory, such as a cache. Thus, the one-time user credentials are generated when a federated identification is received at the IDP (perhaps from another IDP), or when a regular set of authenticating credentials are received at the IDP directly from the user.

Additionally, the IDP, if configured to do so, can pass the newly generated one-time username-password to an agent (e.g., proxy node). The agent, operating to protect the application, can pass the generated user credentials to the application using identity injection, among other mechanisms.

The application, which is assumed to require end-user authentication in order to allow access, can connect back to the generating IDP using the LDAP or a structured query language (SQL), for example (whichever the application is configured to use), and authenticates the user to the generating IDP using the credentials passed to it, instead of authenticating to the original store using the original credentials. The generating IDP checks its cache for the presence of the credentials and either validates the credentials, or denies access to the user.

Attributes that have been sent to the generating IDP using a token can be used by the application via the LDAP/SQL connection that has been established. The token data can also be used to map the authenticated user to another existing account. The resulting account map can be used to permit LDAP/SQL proxy read operations. In this way, user attributes that are requested via this connection can be obtained using the accompanying protocol. This process is useful, for example, when multiple users are granted access to a single account, without disclosing the access credentials to the users.

In most embodiments, the generated user credentials can become invalid in several ways. For example, after an activity timeout (e.g., if no user asks for a particular application for 30 minutes), or after an explicit logout by the user via the generating IDP (or using a service provider, or some other entity that can communicate to the generating IDP). In some cases, a system administrator can also terminate a login session to invalidate the generated user credentials.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit various embodiments.

FIG. 1 is a flow diagram illustrating methods 111 of implementing multiple access authentication according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when accessed and executed by a specific machine, perform the processing depicted in FIG. 1. Given this context, multiple access authentication is now discussed with reference to FIG. 1.

In some embodiments, a processor-implemented method 111 can be executed on one or more processors that perform the method. Activities included in the method 111 may comprise receiving original user credentials, generating generated user credentials, receiving a user request for the application, and transmitting the generated user credentials to authenticate the user as long as the generated credentials are valid.

Thus, in some embodiments, a method 111 to implement multiple access authentication may begin at block 121 with receiving, at a generating IDP, original user credentials sufficient to authenticate a user directly from a user machine, or indirectly from an initial identity provider.

The original credentials can be provided in many ways, such as by a user entering a username-password from a keyboard, via smart card, or as part of a token (e.g., a certificate, such as an X.509.3 certificate). Those that desire to learn more about X.509.3 certificates are encouraged to refer to the ITU-T 2000 Recommendation X.509, ISO/IEC 9594-8. Information Technology—Open Systems Interconnection—The Directory: Public-key and Attribute Certificate Frameworks, 4th ed., which is well known to those of ordinary skill in the art. Thus, the activity at block 121 may further comprise receiving the original user credentials as a username-password pair, as part of a token, or as provided by a smart card.

The method 111 may continue on to block 125 with generating, by the generating IDP, generated user credentials having the lifetime of a login session associated with the user. The lifetime may be initiated approximately when the original user credentials or a token associated with the user are/is validated at the generating IDP.

The generated user credentials may exist in the form of an LDAP username and password. Thus, the activity at block 125 may comprise generating the generated user credentials as an LDAP username and password.

The generated user credentials can be cached during the login session to speed up the response to future requests from the same user. Thus, the method 111 may continue on to block 129 with caching the generated user credentials, by the generating IDP, during the login session.

The method 111 may continue on to block 133 to determine whether a user request to access an application has been received. If not, and a selected amount of time has passed, then the method 111 may operate to invalidate the generated user credentials and continue on to block 121. Otherwise, the activity at block 133 may comprise receiving a request associated with the user during the login session to access an application protected by an agent.

The request to access the application may originate from a user machine. Thus, the activity at block 133 may comprise receiving the request from the user machine.

The method 111 may continue on to block 137 to include transmitting at least part of the generated user credentials from the generating IDP to the application, to authenticate the user to the generating IDP while the login session is not terminated or expired.

The agent may use the credentials to authenticate back to the generating IDP. The generated user credentials can be communicated in many ways, such as by using LDAP/SQL. Thus, the activity at block 137 may comprise communicating, by the agent, the generated user credentials to the generating IDP using the LDAP or a SQL.

The agent can be configured to access the generating IDP and the generated user credentials when additional service requests are made by the same user during the same session. The services may be hosted by a back-end node, such as a back-end web server. Thus, the method 111 may go on to block 141 to include receiving additional requests for additional services, such as services hosted by a back-end node.

The method 111 may conclude at block 145 with configuring the agent to access the generating IDP and the generated user credentials when authenticating the user (e.g., in response to additional requests for additional services hosted by a back-end node). Other embodiments may be realized.

Figure 2:
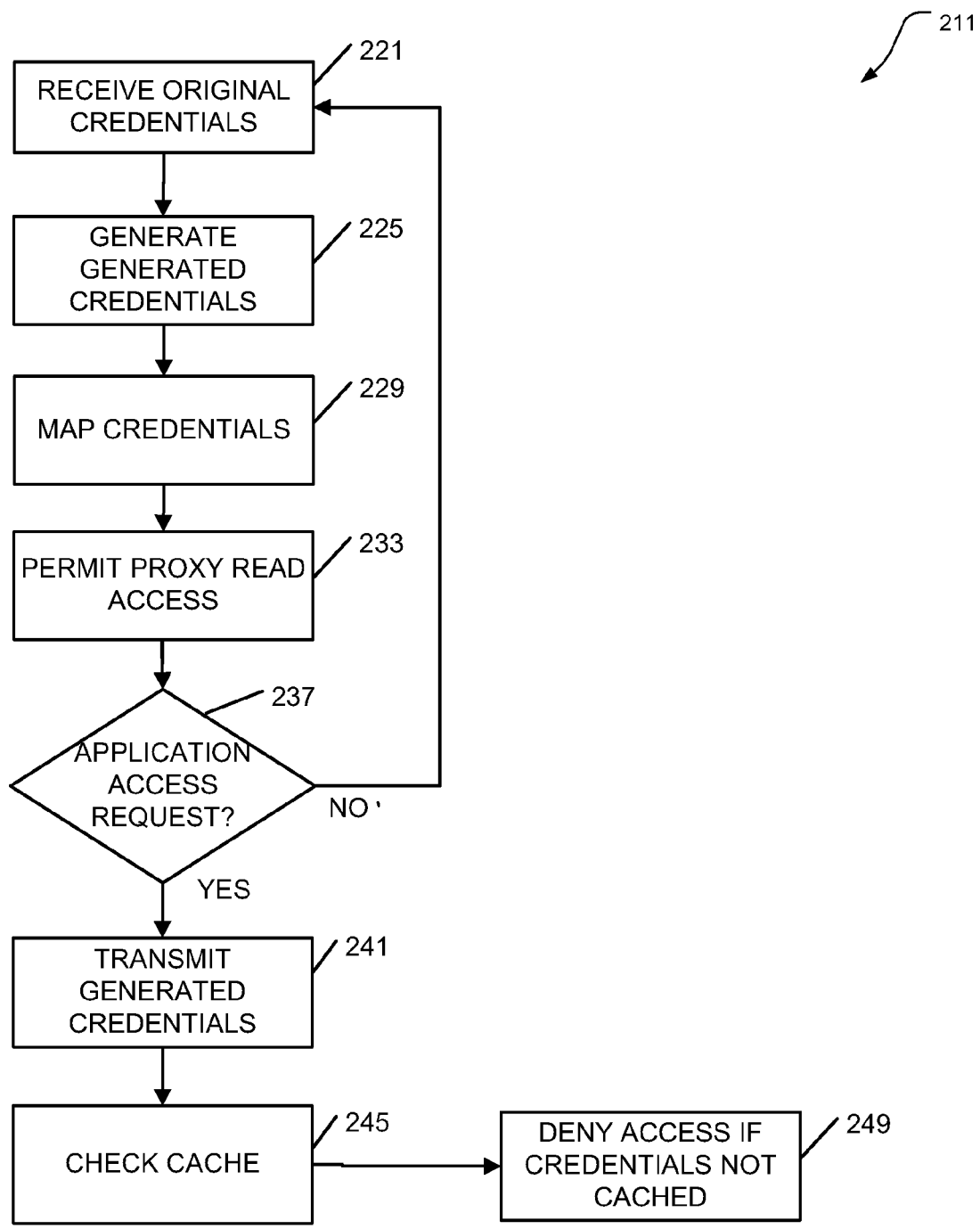
FIG. 2 is a flow diagram illustrating additional methods of implementing multiple access authentication according to various embodiments of the invention.

For example, FIG. 2 is a flow diagram illustrating additional methods 211 of implementing multiple access authentication according to various embodiments of the invention. In this case, the methods 211 may explicitly incorporate the use of an LDAP server. The methods 211 are implemented in a machine-accessible and readable medium, and are operational over processes within and among networks. The networks may be wired, wireless, or a combination of wired and wireless. The methods 211 may be implemented as instructions, which when accessed and executed by a specific machine, perform the processing depicted in FIG. 2.

Thus, in some embodiments, a processor-implemented method 211 that can be executed on one or more processors that perform the method may begin at block 221 with receiving, at a generating IDP, original user credentials sufficient to authenticate a user directly from a user machine, or indirectly from an initial identity provider.

A SAML token can be received as an indication of receiving original user credentials. Thus, the activity at block 221 may further comprise receiving a SAML token as the token from the initial identity provider to indicate that the original credentials have been received by the initial identity provider.

The method 211 may continue on to block 225 to include generating, by the generating IDP, generated user credentials having the lifetime of a login session associated with the user. The lifetime may be initiated approximately when the original user credentials or a token associated with the user are/is validated at the generating IDP.

In some embodiments, the authenticated user might be mapped to another existing account, to access an additional application. Thus, the method 211 may continue on to block 229 to include, after the generating, and during the login session, mapping the generated user credentials to an account associated with another application.

The map of accounts linked to the generated user credentials may be accessed to obtain additional user attributes. Thus, the method 211 may continue on to block 233 to include permitting proxy read access by the agent to a map of accounts associated with the generated user credentials.

The method 211 may continue on to block 237 to determine whether a user request to access an application has been received. If not, and a selected amount of time has elapsed, then the method 211 may operate to invalidate the generated user credentials and continue on to block 221. Otherwise, the activity at block 237 may comprise receiving a request associated with the user during the login session to access an application protected by an agent.

The request for the application may originate from a network browsing application, such as the Microsoft® Internet Explorer™ browser. Thus, the activity at block 237 may further comprise receiving the request from a network browsing application.

The method 211 may continue on to block 241 to include transmitting at least part of the generated user credentials from the generating IDP to the application to authenticate the user to the generating IDP via an LDAP server while the login session is not terminated or expired. The LDAP server associated with the generating IDP can reside within the node housing the generating IDP, or be located at some other node, external to the generating IDP.

If configured to do so, the agent, as a proxy, can pass the generated user credentials to the application using identity injection. Thus, the activity at block 241 may further include transmitting the generated user credentials to the application via the agent using identity injection.

The generating IDP can check its cache for the presence of the generated user credentials. Thus, the method 211 may continue on to block 245 to include checking for the presence of the generated user credentials in a cache. The method 211 may further include denying access to the application if the generated user credentials are not found in the cache, as shown at block 249.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of multiple access authentication shown in FIGS. 1 and 2 can be implemented in various devices, as well as in a computer-readable storage medium, where the methods are executed by one or more processors. Further details of such embodiments will now be described.

Figure 3:
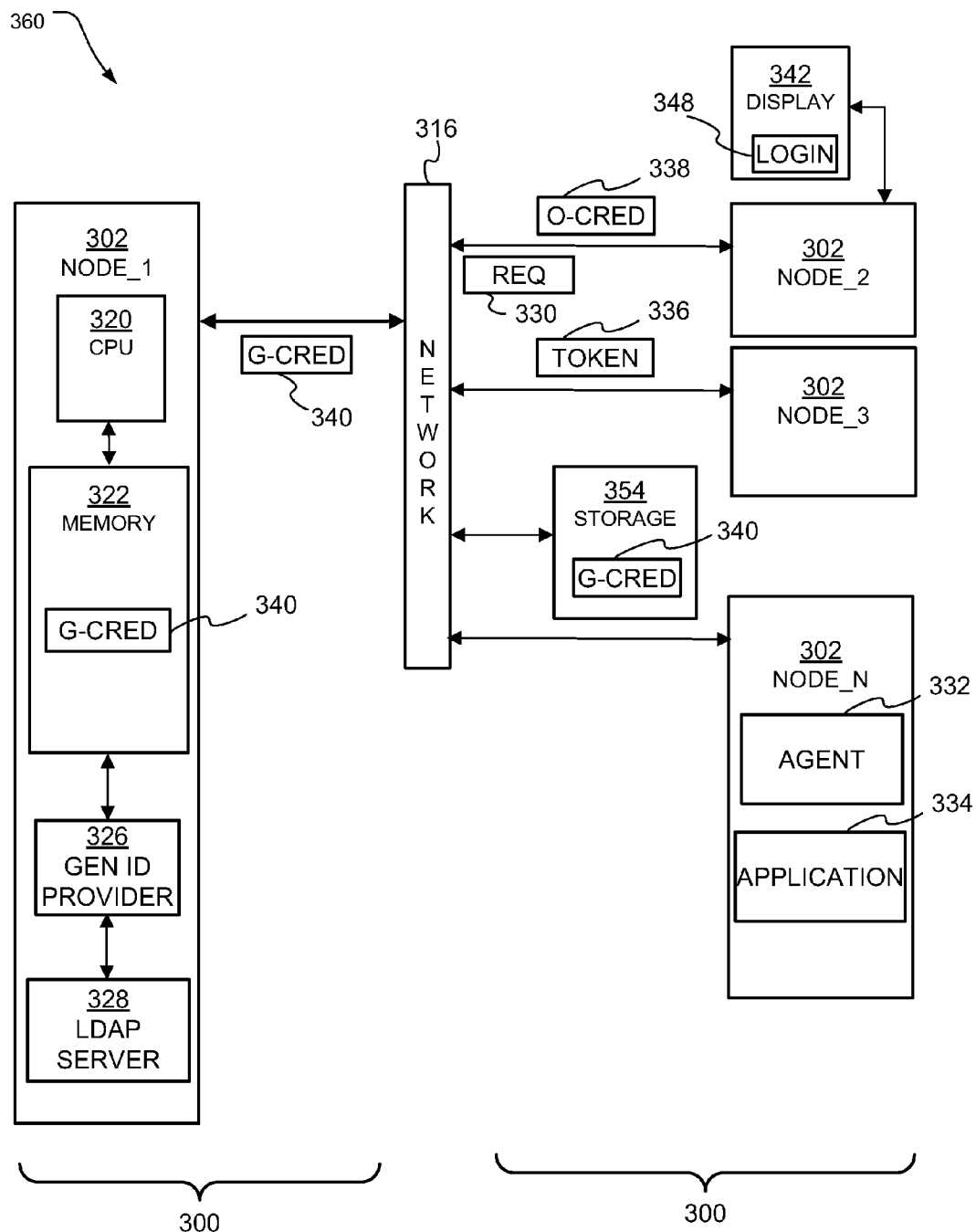
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement multiple access authentication may comprise one or more processing nodes 302, one or more processors 320, memory 322, a generating IDP 326, and an LDAP server 328 (which may also be located external to the node that includes the generating IDP 326). The apparatus 300 may comprise a server, a client, or some other networked processing node.

The processing nodes 302 may comprise physical machines or virtual machines, or a mixture of both. The nodes 302 may also comprise networked entities, such servers and/or clients. In some implementations, the operations described can occur entirely within a single node 302.

In some embodiments then, an apparatus 300 may comprise a node (e.g., NODE_1) that includes a generating IDP 326 to receive original user credentials 338 sufficient to authenticate a user directly from a user machine (e.g., NODE_2), or indirectly from an initial identity provider (e.g., NODE_3), to generate generated user credentials 340 having the lifetime of a login session associated with the user. As noted previously, the lifetime of the credentials 340 may be initiated approximately when the original user credentials 338 or a token 336 associated with the user is validated at the generating IDP 326.

The generating IDP 326 may operate to receive a request 330 associated with the user during the login session to access an application 334 protected by an agent 332, and to transmit at least part of the generated user credentials 340 to the application 334 to authenticate the user while the login session is not terminated or expired.

The apparatus 300 may include an LDAP server 328, which may operate to receive the generated user credentials 340. Since the generated user credentials 340 may be cached in some embodiments, the apparatus 300 may comprise a memory 322 to cache the generated user credentials 340. Still further embodiments may be realized.

For example, it can be seen that a system 360 that operates to implement multiple access authentication may comprise multiple instances of the apparatus 300. The system 360 might also comprise a cluster of nodes 302, including physical and virtual nodes. It should be noted that any one of the nodes 302 may include any one or more of the elements explicitly shown in any other one of the nodes NODE_1, NODE_2, . . . , NODE_N.

In some embodiments then, a system 360 can operate using one or more nodes 302. That is, a system 360 may comprise a first node (e.g., NODE_1) that comprises a generating IDP 326, operating as previously described. The system 360 may further comprise a second node (e.g., NODE_N) to host the agent 332.

The system 360 may include another node, to serve as the initial identity provider (e.g., as a SAML token 336 provider that initially authenticates the user). Thus, the system 360 may further comprise a third node (e.g., NODE_3) to host the initial identity provider.

The agent 332 that operates to protect the application 334 may operate as a proxy agent. Thus, the agent 332 may comprise a hypertext transfer protocol proxy agent in some embodiments.

The nodes 302 may exist as a device embedded within another structure (e.g., as an embedded device), or as a regular desktop or laptop computer that includes a display 342 to show the activities conducted while the node 302 is active. Thus, the system 360 may also comprise a display 342 coupled to the nodes 302 to display visible indications of the activities conducted at the nodes 302, including application information, policy information, and/or login information 348.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
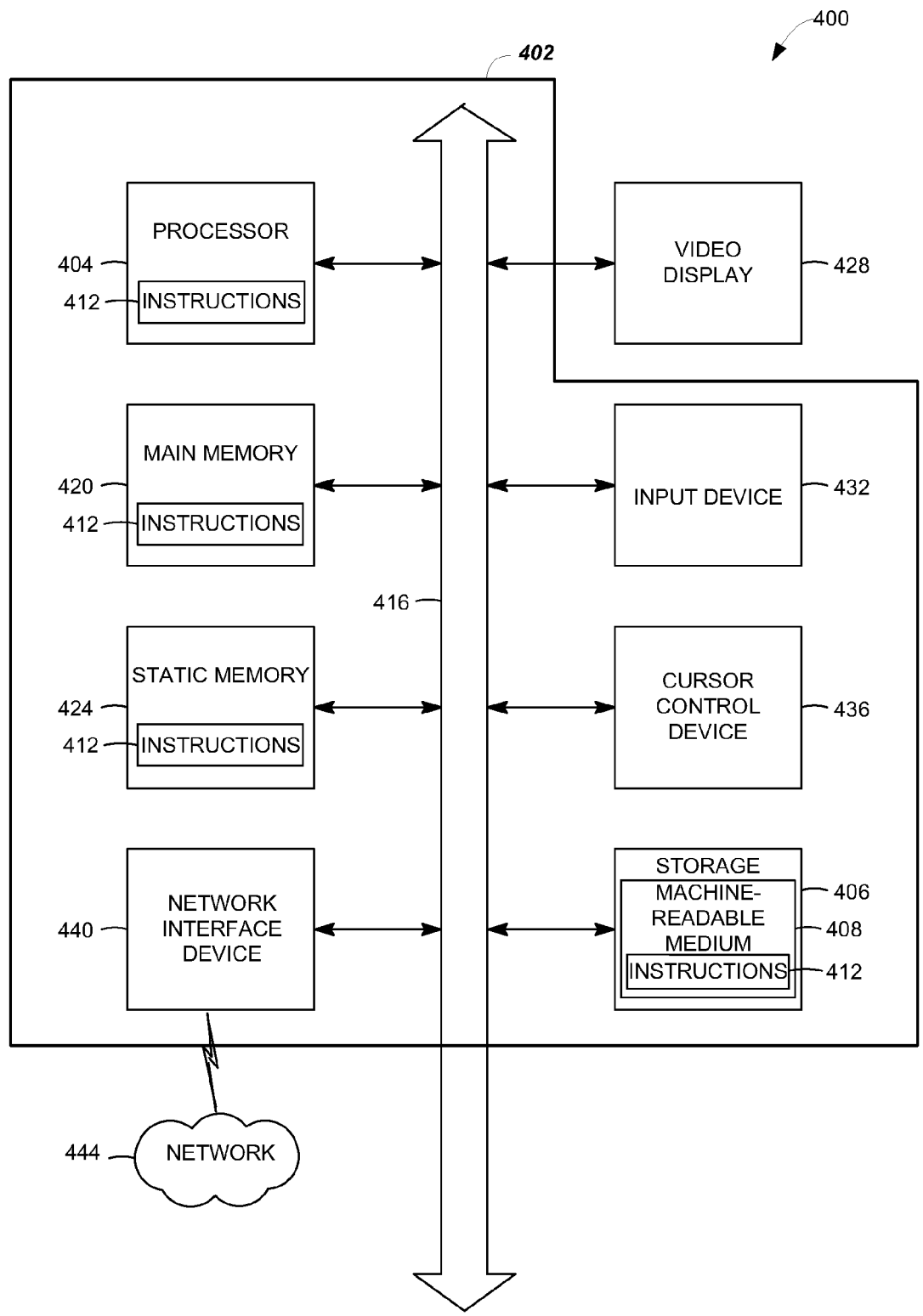
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and/or a variety of storage media), such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to enable applications that are configured to use LDAP or SQL authentication to also take advantage of token-based authentication mechanisms, including SAML. Passwords may be kept more securely. In addition, legacy applications should not need modification to make use of the various embodiments described herein. Increased network security, operational efficiency, and user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a node comprising a physical machine having a generating identity provider (IDP), the generating IDP to:
receive original user credentials sufficient to authenticate a user directly from a user machine, or indirectly from an initial IDP, the original user credentials including at least one of a username password combination directly from the user or a token from the initial IDP;
generate generated user credentials, the generated user credentials including a unique user name and password combination different from that initially provided by the user for the original user credentials, the generated user credentials having a lifetime of a login session associated with the user, the lifetime initiated in response to validation of the original user credentials or validation of the token by the generating IDP;
receive a request associated with the user during the login session to access an application protected by an agent;
transmit the username and password of the generated user credentials to the application to authenticate the user while the login session is not terminated;
receive an authentication request from the agent using the username and password of the generated user credentials;
provide authentication to the agent based on the username and password of the generated user credentials while the login session is not terminated; and
invalidate the generated user credentials in response to login session termination, the login session termination occurring after an activity timeout, an explicit logout from the user at the generating IDP, or an administrator terminating the login session.

2. The apparatus of claim 1, further comprising:
an LDAP server to receive the generated user credentials.

3. The apparatus of claim 1, further comprising:
a memory to cache the generated user credentials.

4. A system, comprising:
a first node comprising a physical machine having a generating identity provider (IDP), the generating IDP to:
receive original user credentials sufficient to authenticate a user directly from a user machine, or indirectly from an initial IDP, the original user credentials including at least one of a username password combination directly from the user or a token from the initial IDP;
generate generated user credentials, the generated user credentials including a unique user name and password combination different from that initially provided by the user for the original user credentials, the generated user credentials having a lifetime of a login session associated with the user, the lifetime initiated in response to validation of the original user credentials or validation of the token by the generating IDP;
receive a request associated with the user during the login session to access an application protected by an agent;
transmit the username and password of the generated user credentials to the application to authenticate the user while the login session is not terminated;
receive an authentication request from the agent using the at least part of the generated user credentials;
provide authentication to the agent based on the at least part of the generated user credentials while the login session is not terminated; and
invalidate the generated user credentials in response to login session termination, the login session termination occurring after an activity timeout, an explicit logout from the user at the generating IDP, or an administrator terminating the login session; and
a second node to host the agent.

5. The system of claim 4, further comprising:
a third node to host the initial identity provider.

6. The system of claim 4, wherein the agent comprises a hypertext transfer protocol proxy agent.

7. A processor-implemented method to execute on one or more processors that perform the method, comprising:
receiving, at a generating identity provider (IDP), original user credentials sufficient to authenticate a user directly from a user machine, or indirectly from an initial IDP, the original user credentials including at least one of a username password combination directly from the user or a token from the initial IDP;
generating, by the generating IDP, generated user credentials, the generated user credentials including a unique user name and password combination different from that initially provided by the user for the original user credentials, the generated user credentials having a lifetime of a login session associated with the user, the lifetime initiated in response to validation of the original user credentials or validation of the token by the generating IDP;
receiving, by the generating IDP, a request associated with the user during the login session to access an application protected by an agent;
transmitting, by the generating IDP, the username and password of the generated user credentials from the generating IDP to the application to authenticate the user to the generating IDP while the login session is not terminated;
receiving, by the generating IDP, an authentication request from the agent using the username and password of the generated user credentials;
providing, by the generating IDP, authentication to the agent based on the username and password of the generated user credentials while the login session is not terminated; and
invalidating, by the generating IDP, the generated user credentials in response to login session termination, the login session termination occurring after an activity timeout, an explicit logout from the user at the generating IDP, or an administrator terminating the login session.

8. The method of claim 7, wherein receiving the original user credentials comprises:
receiving the original user credentials as a username-password pair, as part of a token, or as provided by a smart card.

9. The method of claim 7, further comprising:
caching the generated user credentials, by the generating IDP, during the login session.

10. The method of claim 7, further comprising:
configuring the agent to access the generating IDP and the generated user credentials when authenticating the user in response to additional requests for additional services hosted by a back-end node.

11. The method of claim 7, wherein the transmitting further comprises:
communicating, by the agent, the generated user credentials to the generating IDP using a lightweight directory access protocol (LDAP) or a structured query language (SQL).

12. The method of claim 7, wherein receiving the request comprises:
   receiving the request from the user machine.

13. The method of claim 7, wherein the generating comprises:
   generating the generated user credentials as a lightweight directory access protocol (LDAP) username and password.

14. A processor-implemented method to execute on one or more processors that perform the method, comprising:
   receiving, at a generating identity provider (IDP), original user credentials sufficient to authenticate a user directly from a user machine, or indirectly from an initial IDP, the original user credentials including at least one of a username password combination directly from the user or a token from the initial IDP;
   generating, by the generating IDP, generated user credentials, the generated user credentials including a unique user name and password combination different from that initially provided by the user for the original user credentials, the generated user credentials having a lifetime of a login session associated with the user, the lifetime initiated in response to validation of the original user credentials or validation of the token by the generating IDP;
   receiving, by the generating IDP, a request associated with the user during the login session to access an application protected by an agent;
   transmitting, by the generating IDP, the username and password of the generated user credentials from the generating IDP to the application to authenticate the user to the generating IDP via a lightweight directory access protocol (LDAP) server while the login session is not terminated;
   receiving, by the generating IDP, an authentication request from the agent using the username and password of the generated user credentials;
   providing, by the generating IDP, authentication to the agent based on the username and password of the generated user credentials while the login session is not terminated; and
   invalidating, by the generating IDP, the generated user credentials in response to login session termination, the login session termination occurring after an activity timeout, an explicit logout from the user at the generating IDP, or an administrator terminating the login session.

15. The method of claim 14, wherein receiving the request comprises:
   receiving the request from a network browsing application.

16. The method of claim 14, further comprising:
   after the generating, and during the login session, mapping the generated user credentials to an account associated with another application.

17. The method of claim 14, further comprising:
   receiving a security assertion markup language (SAML) token as the token from the initial identity provider to indicate that the original credentials have been received by the initial identity provider.

18. The method of claim 14, further comprising:
   transmitting the generated user credentials to the application via the agent using identity injection.

19. The method of claim 14, further comprising:
   checking for the presence of the generated user credentials in a cache; and
   denying access to the application if the generated user credentials are not found in the cache.

20. The method of claim 14, further comprising: permitting proxy read access by the agent to a map of accounts associated with the generated user credentials.

* * * * *